United States Patent [19]
Ouellette

[11] Patent Number: 5,702,233
[45] Date of Patent: Dec. 30, 1997

[54] BLADE OPENING FILLER

[75] Inventor: David A. Ouellette, Farmington, Conn.

[73] Assignee: United Technologies Corporation, Windsor Locks, Conn.

[21] Appl. No.: 638,475

[22] Filed: Apr. 26, 1996

[51] Int. Cl.⁶ ................................................. F04D 29/18
[52] U.S. Cl. .................................. 416/245 R; 416/244 A
[58] Field of Search .......................... 416/193 R, 245 R, 416/244 A, 239, 94

[56] References Cited

U.S. PATENT DOCUMENTS

| | | | |
|---|---|---|---|
| 140,553 | 1/1873 | Smith | 126/315 |
| 573,571 | 12/1896 | Anderson | 464/176 |
| 1,278,895 | 11/1918 | Farley | 126/315 |
| 1,668,972 | 5/1928 | McCauley | 416/245 R |
| 2,520,687 | 8/1950 | Martin et al. | 416/245 R |
| 2,612,227 | 9/1952 | Cushman | 416/245 R |
| 2,614,638 | 10/1952 | Beaupre | 416/245 R |
| 2,745,501 | 5/1956 | Blanchard et al. | 416/245 R |
| 2,793,702 | 5/1957 | Cushman | 416/245 R |
| 4,308,931 | 1/1982 | Khanna | 180/235 |
| 4,319,467 | 3/1982 | Hegler et al. | 64/32 R |
| 5,331,946 | 7/1994 | Yamini et al. | 126/314 |

FOREIGN PATENT DOCUMENTS

| | | | |
|---|---|---|---|
| 2127495 | 4/1984 | European Pat. Off. | 416/245 R |

*Primary Examiner*—John T. Kwon

[57] ABSTRACT

The present invention provides an apparatus for minimizing the blade opening between the blade shank of propeller and spinner in order to improve the overall efficiency of an aircraft and propeller system. The present invention consists of a two piece blade opening filler; the bulkhead insert which attaches to the bulkhead, and the spinner insert which maybe attached to bulkhead insert after installation of the propeller blade. The blade opening filler fills the blade opening between the spinner and blade shank while facilitating maintenance of the system.

20 Claims, 6 Drawing Sheets

BLADE OPENING FILLER

BACKGROUND OF THE INVENTION

This invention relates to a propeller system and more particularly to an apparatus which increases system efficiency by reducing losses caused by air moving through the blade opening between the spinner and blade shank.

A propeller system's, and thus an aircraft's overall aerodynamic efficiency is increased by incorporating a conical nose piece, known as spinner. The spinner covers the propeller hub and associated propeller control hardware and attaches to a bulkhead. The bulkhead separates the propeller system from the engine. Further, the spinner has blade openings through which extend the blade shank of the propeller blades. This spinner is designed to work with the blade design and engine nacelle to provide a low drag coefficient and improve aerodynamic efficiency. The spinner surface is often contoured to aid in achieving this goal.

In addition to designing for aerodynamic efficiency the spinner must facilitate maintenance of the propeller system, therefore, the spinner must be removable with the propeller blades installed. To achieve this goal, the blade opening in the spinner is continued on the bulkhead side of the blade shank. In addition, the blade openings must be sized to allow for rotation of the blade shank. Therefore, because the blade shank does not completely fill the blade opening, there is a blade opening between the blade shank and the edge of the spinner and bulkhead. Air flowing through this blade opening reduces the overall aerodynamic efficiency of the propeller system and thus the aerodynamic efficiency of the aircraft.

Typically, blade shank collars have been used to minimize the blade opening. A collar is placed around the blade shank such that when the blade is installed the collar can be aligned with the plane of the spinner surface. However, because the spinner surface is contoured and the blade is rotated about its longitudinal axis for various flight modes, the collar can only be optimized for a particular blade angle. Also, the blade collar has to be sized to leave a small gap between the collar and spinner to allow for movement in the blade shank induced by mechanical vibration and aerodynamic forces.

What is needed to overcome the deficiencies of the prior art is an apparatus to fill the opening between the propeller shank, spinner, and bulkhead of an aircraft for the various flight modes while allowing for maintenance of the propeller system.

Accordingly, it is the object of this invention to provide an aerodynamic blade opening filler that reduces the opening between the spinner and blade shank to improve overall propeller system/aircraft efficiency.

It is a further object of this invention to provide a blade opening filler that facilitates maintenance of the propeller system.

SUMMARY OF THE INVENTION

An improved propeller system is disclosed which improves aerodynamic efficiency by reducing the blade opening between the blade shank and the spinner and bulkhead.

In the preferred embodiment, a blade opening filler is inserted in the blade opening between the blade shank, spinner, and bulkhead. The blade opening filler consists of two subassemblies; a spinner insert and a bulkhead insert, allowing for ease of assembly and service. The spinner insert fills a first portion of the opening between the spinner and blade shank and the bulkhead insert fills a second portion of the opening between the blade shank and bulkhead. The bulkhead insert is attached to the bulkhead during assembly and the spinner insert fits around the blade shank of the already installed propeller blades and into the bulkhead insert. The spinner is attached to the bulkhead such the blade opening filler fills the blade opening.

In a second embodiment for use with oval or non-circular blade shanks, a collar may be installed around the blade shank on the hub side (interior) of the blade opening filler. Spring clips are then inserted which hold the collar against the blade gap filler to eliminate gaps while the propeller blade is rotated for various operational modes.

The above and other objects and advantages of this invention will become more readily apparent when the following description is read in conjunction with the accompanying drawings.

DETAILED DESCRIPTION OF THE PREFERRED EMBODIMENTS

Figures 1, 2:
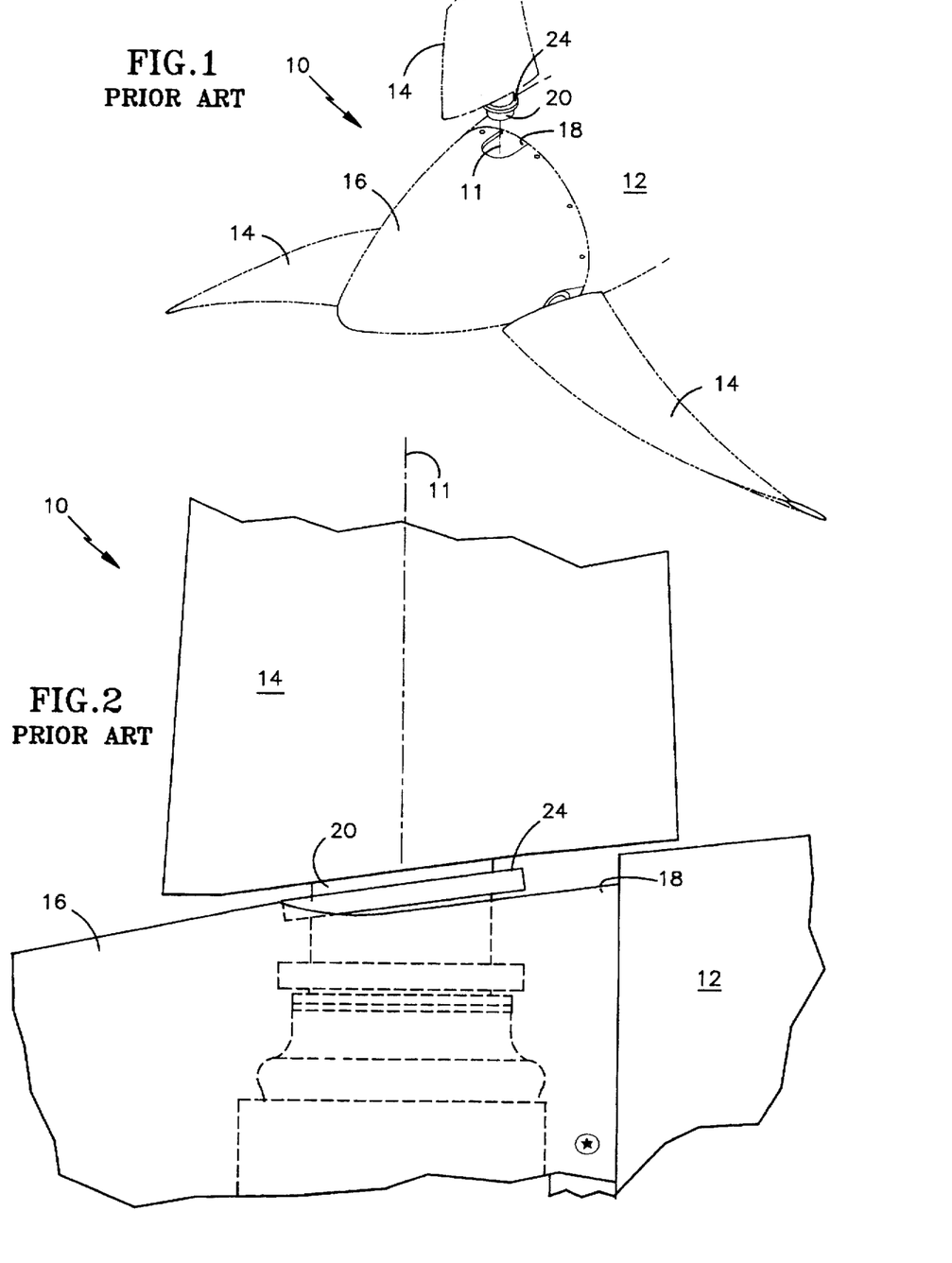
FIG. 1 is a perspective view of a "Prior Art" propeller system.
FIG. 2 is a partial cut away of a "Prior Art" propeller system with a collar installed.

FIG. 1 shows a prior art propeller system generally designated by the numeral 10. The typical propeller system comprises, a propeller hub (not shown) mounted to an engine shaft (not shown) such that the propeller hub is on the spinner side of the bulkhead 12. The propeller blades 14 are then inserted into the hub. The spinner 16 is then placed over the fully assembled hub and blade assembly to improve the aerodynamic efficiency of the propeller system 10. The spinner 16 has an interior surface facing the propeller and an exterior surface for directing the flow of air thereover. The spinner 16 is then attached to the bulkhead 12 by conventional means.

Blade openings 18, in the contour of the spinner, are necessary to allow the spinner 16 to fit over the fully assembled hub and blade assembly. The blade opening 18 must be sized to fit around the blade shank 20 of the propeller blade 14. Often the blade shank 20 is non-circular necessitating a blade opening 18 that is wide enough to allow for rotation of the propeller blade 14 about its longitudinal axis 11, running the length of the blade, as required for various flight modes. FIG. 2 shows the propeller blade 14 installed in the propeller system 10. Aerodynamic inefficiencies result from turbulence between the blade shank 20 of the propeller blade 14 and the spinner 16 in the area of the blade opening 18.

One way to minimize these losses is to fix a collar 24 to the blade shank 20. The collar 24 is positioned such that it follows the contour of the of the spinner 16 and bulkhead 12 to minimize the blade opening 18. However, the propeller blade 14 rotates about its longitudinal axis for various flight modes therefore the blade opening 18 can only be minimized for a pre-selected blade position.

Figure 3:
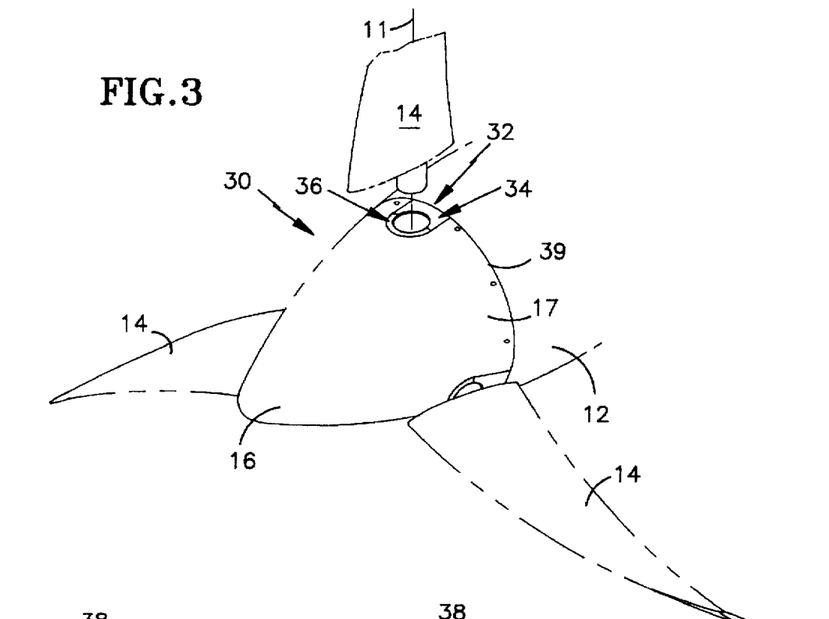
FIG. 3 is a spinner assembly with the Blade Opening Filler of the present invention.

FIG. 3 shows a propeller system, according to the present invention, generally designated by the numeral 30 which comprises a typical propeller system 30, and a blade opening filler 32 constructed in accordance with the present invention.

Figure 4:
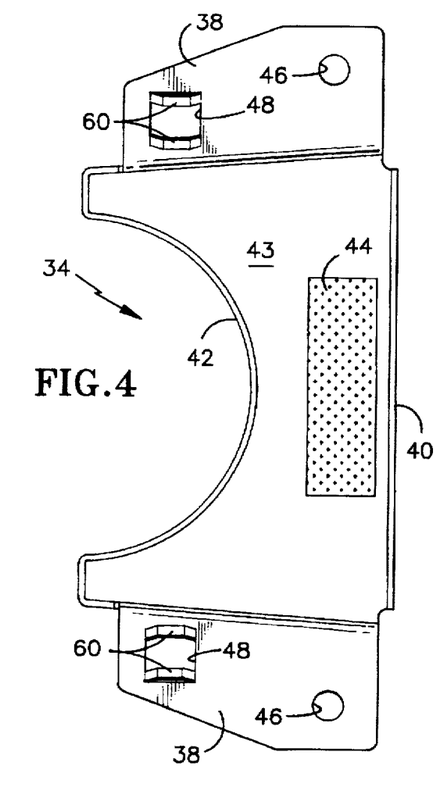
FIG. 4 is an interior view of the bulkhead insert.
Figure 5:
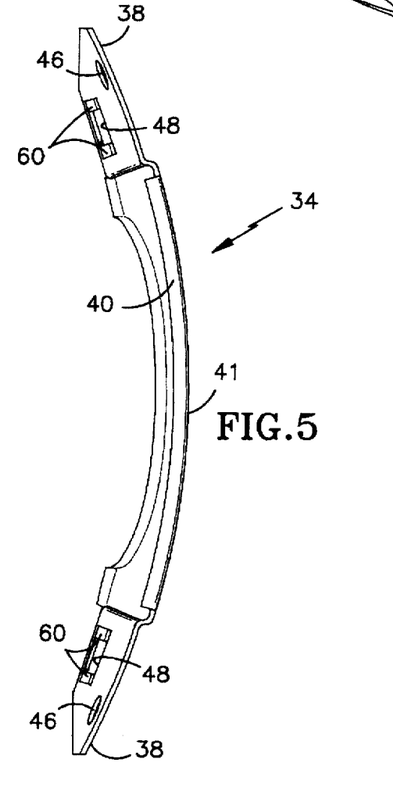
FIG. 5 is a fight side view of FIG. 4.

The blade opening filler 32, as shown in FIG. 3, is comprised of two major subassemblies, the bulkhead insert 34, and the spinner insert 36. The bulkhead insert 34 as seen in FIGS. 4 and 5 is a one piece plate, e.g. metal having 3 sections, two end sections 38 and a middle section 40.

The middle section 40 has length generally equal to the distance of blade opening 18 as measured at the interface 39 of the blade opening 18 and the bulkhead 12. The middle section also has exterior portion 41 that is contoured as shown in FIG. 5, such that when it is installed in the blade opening 18 between the blade shank 20 and the spinner 16 and the bulkhead 12, the middle section will form a generally smooth continuation of the exterior surface of the spinner 16. The middle section 40 has top edge 42 that is contoured to follow the outer circumference defined by the rotation of the blade shank 20 during operation. An adhesive strip, e.g. VELCRO strip 44 is located on the interior surface 43 of the middle portion 40 to hold the filler 34 in place during assembly of the propeller system 30. The VELCRO strip 44 attaches to a mating strip (not shown) located on the bulkhead 12.

The two end sections 38 are attached to and located at both ends of the length of the middle section 40. The two end sections 38 are positioned relative to the middle section 40 such that when the exterior portion 41 of the middle section 40 is flush with the exterior surface 17 of the spinner 16 the end sections 38 will conform to and abut the interior surface of the spinner 16. The length of the end sections 38, as measured along the mating surface 39 of the spinner 16 and bulkhead 12, extend under the spinner assembly 16 a sufficient distance to insure the bulkhead insert 34 will be held in place during operation.

Each end section 38 further contains through holes 46 such that when assembled between the spinner 16 and the bulkhead 12, conventional fasteners 63 may be inserted through the spinner 16 and bulkhead insert 34 into the bulkhead 12.

Figure 7:
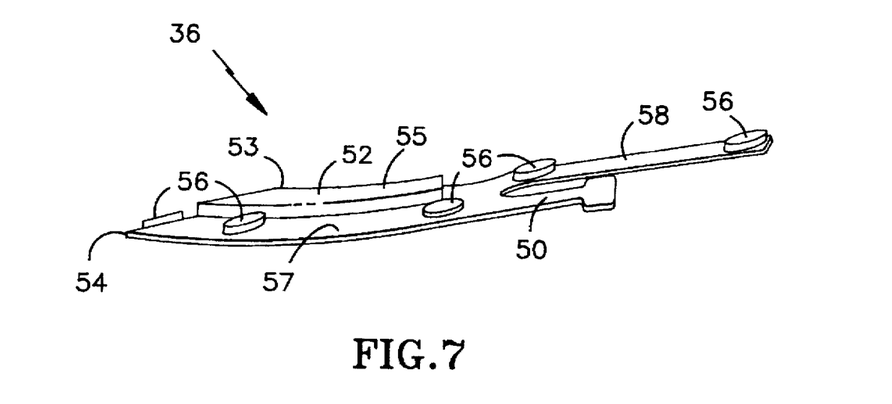
FIG. 7 is a side view of the spinner insert.
Figure 8:
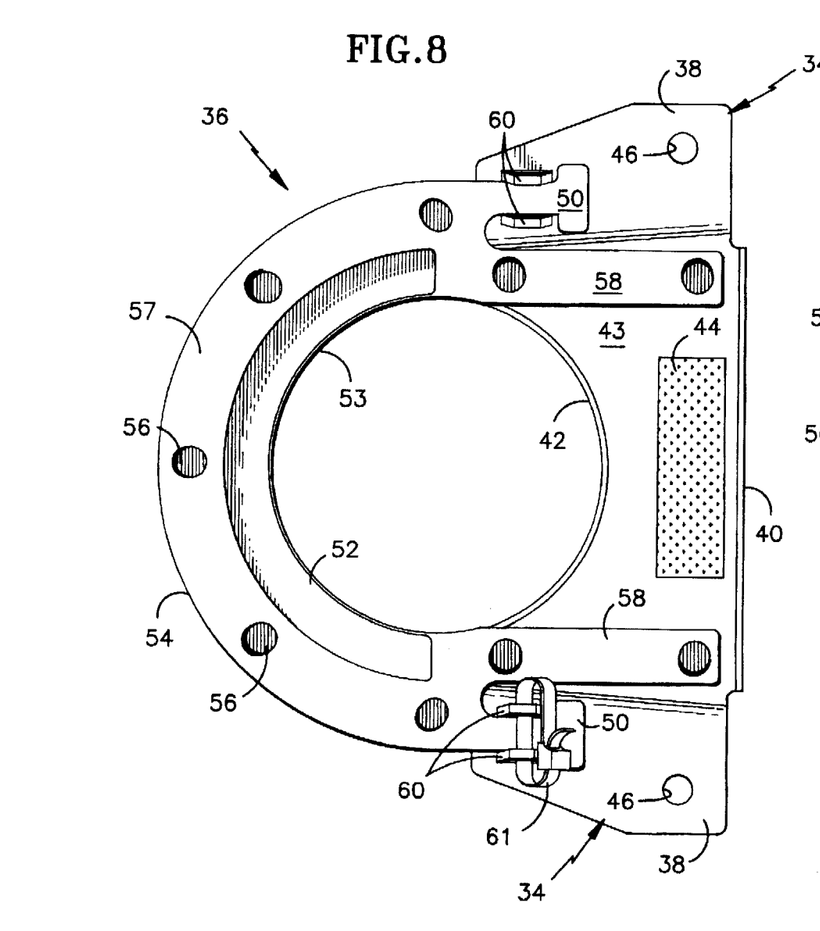
FIG. 8 is an interior view of the Blade Opening Filler
Figure 9:
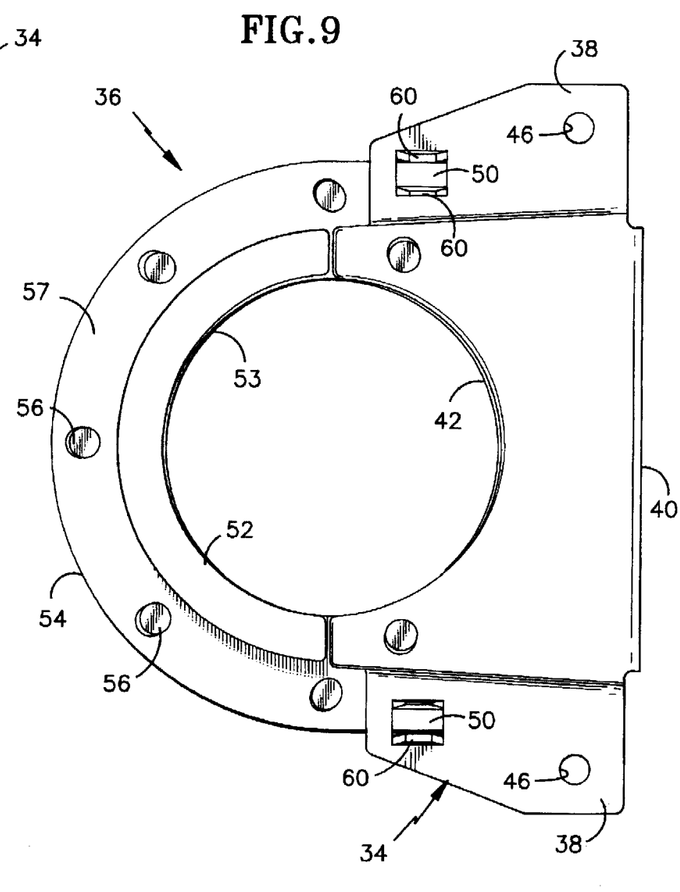
FIG. 9 is a front view of the Blade Opening Filler
Figure 10:
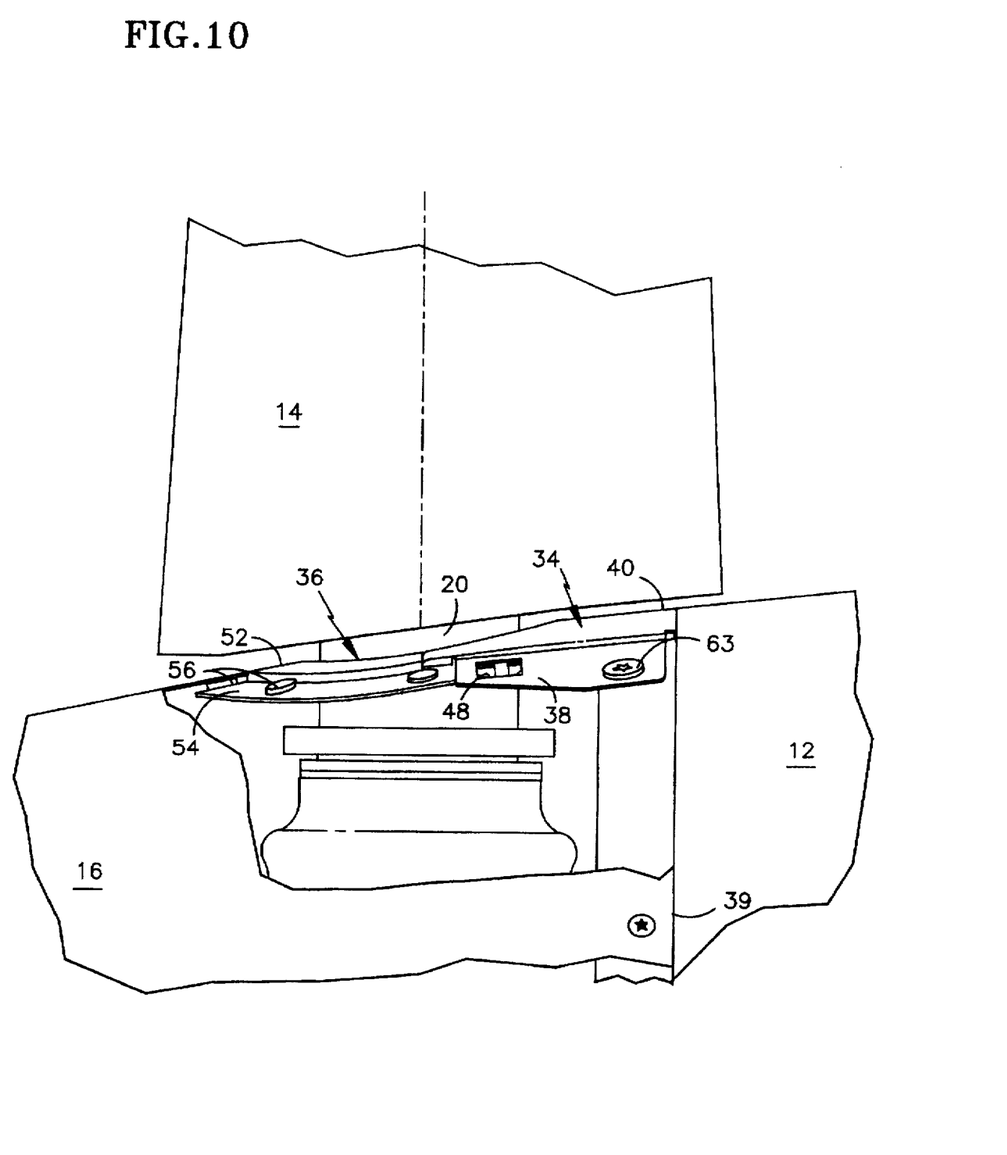
FIG. 10 is a propeller system with the Blade Opening Filler installed in the spinner assembly with the spinner partially cut away.

A bracket 60 is located on each end section 38 and extends a distance from the interior surface 43 of the end section 38. The bracket 60 located on an end section 38, is adapted in size and shape such that a tee shaped locking tab 50 of the spinner insert 36 shown in FIG. 6, and described herein, fits within the bracket 60. The bracket 60 shown in greater detail in FIG. 8 is adapted in size and shape such that a fastener, e.g. tie wrap 61 may be inserted through the bracket 60 and across the tee shaped locking tab 50 thus holding the tee shaped locking tab 50 against the interior surface 43 of the bulkhead insert The spinner insert 36 is shown in greater detail in FIGS. 6 and 7. The spinner insert 36 is made of a flexible plastic material such as NYLON 6/6, that has sufficient stiffness to hold the spinner insert 36 against the inside surface of the spinner 16 when installed into the bulkhead insert 34 as described in the previous paragraph. The spinner insert 36 is generally horseshoe shaped and has the same general contour as the spinner 16. The spinner insert 36 generally consists of two sections, a first raised section 52 and a second lower section 54. The first raised section 52 has a width slightly less than the difference between the blade opening 18 and the circumference of the blade shank 20 as measured from the longitudinal axis the blade shank 20. The inner edge 53 of the first raised section 52 is nearest the circumference of the blade shank 20. The raised section 52 has an upper surface 55 that when installed in the spinner housing, as shown in FIG. 10 will form a continuation of the exterior surface of the spinner 16.

Figure 6:
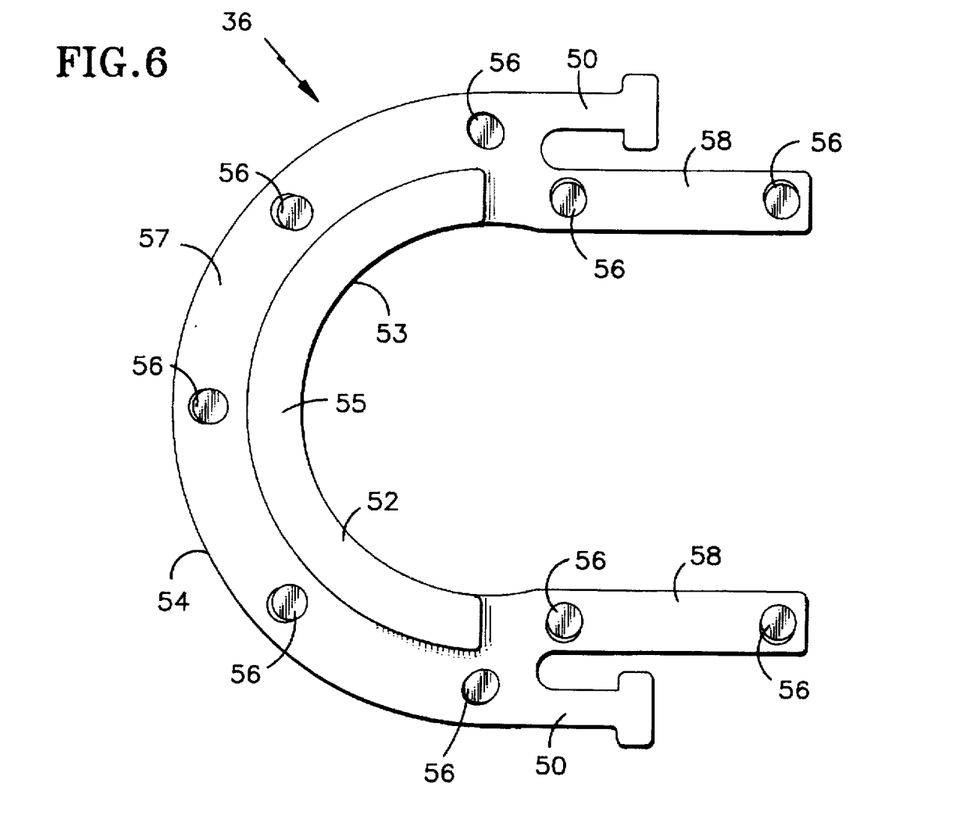
FIG. 6 is a front view of the spinner insert.

The lower sections 54 have protrusions 56 located on its upper surface 57. The protrusions 56 of the lower sections 54 are designed to conform to and abut the interior surface of the spinner 16 when the spinner insert 36 is assembled into the propeller system 30 of FIG. 3.

Extensions 58 are located on the ends of the spinner insert 36 such that when the spinner insert 36 fills the first portion of the blade opening 18 and the bulkhead insert 34 fills a second portion of the blade opening 18, the extensions 58 extend under the bulkhead insert 34. The width of each extension 58, is equal to the width of the raised section 52 with a distance between the outer edge of the extensions 58 equal to the blade opening 18 as measures along the intersection of the spinner 16 and the bulkhead 12.

T shaped locking tabs 50 are located on the lower sections 54 which are adapted in size and shape such that the locking tab 50 may be inserted between the brackets 60.

FIG. 10 shows an assembled blade opening filler 32 installed in a partially assembled propeller system. During assembly the bulkhead insert 34 is held to the bulkhead 12 by the VELCRO strip 44 pressed against a mating VELCRO strip (not shown) mounted on the bulkhead 12. The spinner insert 36 is the placed over the blade shank 20 such that the locking tabs 50 are inserted between the brackets 60 of tab insert slot 48. A fastener 61 is then inserted through the brackets and across the tee shaped locking tab 50 thus holding the spinner insert 36 against the bulkhead insert 34. The action of the fastener 61 also forces the extensions 58 against the bulkhead insert 34.

The spinner 16 is then placed over the assembled hub and blade assembly (not shown) and the blade opening filler :32. The spinner 16 covers the filler end sections 38 of the bulkhead insert 34 and the lower section 54 of the spinner insert 36. The raised section 52 of the spinner insert 36 and the middle section 40 of the bulkhead insert 34 are flush with the exterior and form a continuation of the contour of the spinner 16. The spinner 16 is fastened to the bulkhead 12 using conventional means such as a screw 63. The extensions 58 cooperate with the bulkhead insert 36 to hold the spinner insert 36 against the spinner 16.

Figure 11:
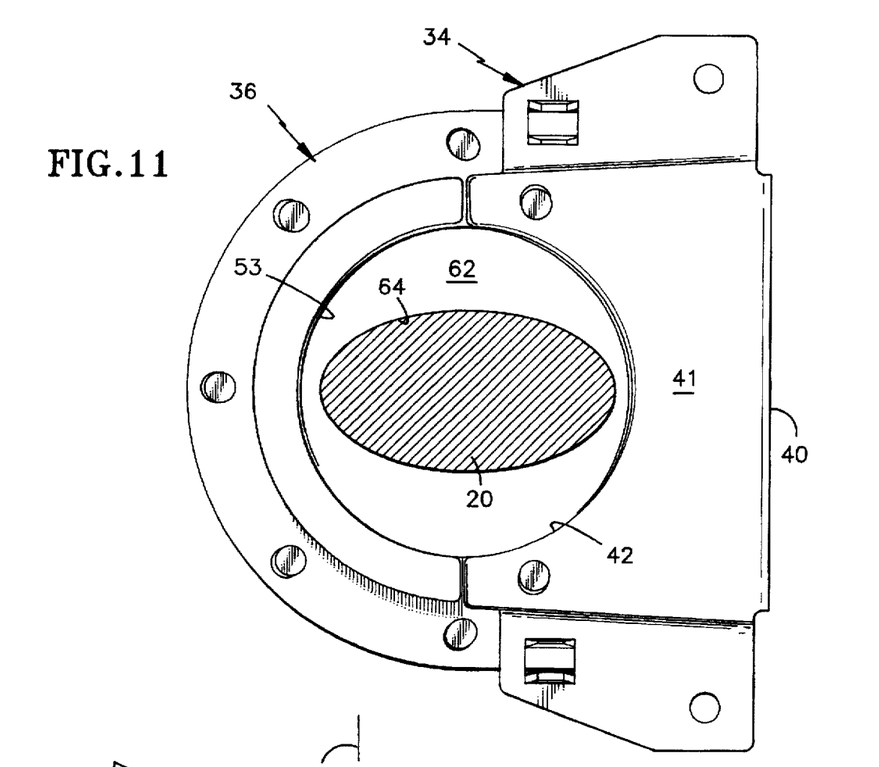
FIG. 11 is a cross-section of a non-circular blade root with a circular collar installed.

In an alternate embodiment shown in FIG. 11, for non-circular or oval blade shanks, a collar 62 is fastened by conventional means e.g. bolt and nut (not shown) around the circumference of the blade shank 20 The collar is generally cylindrical in shape, with a first surface 64 that conforms to the surface of the blade shank 20 and a second surface 66 that forms a circumference that is a distance from the first surface 64 such that when the collar 62 is installed on the blade shank 20 on the hub side of the blade opening filler 32 the second surface extends under the spinner insert :36 and the bulkhead insert 34.

Figure 12:
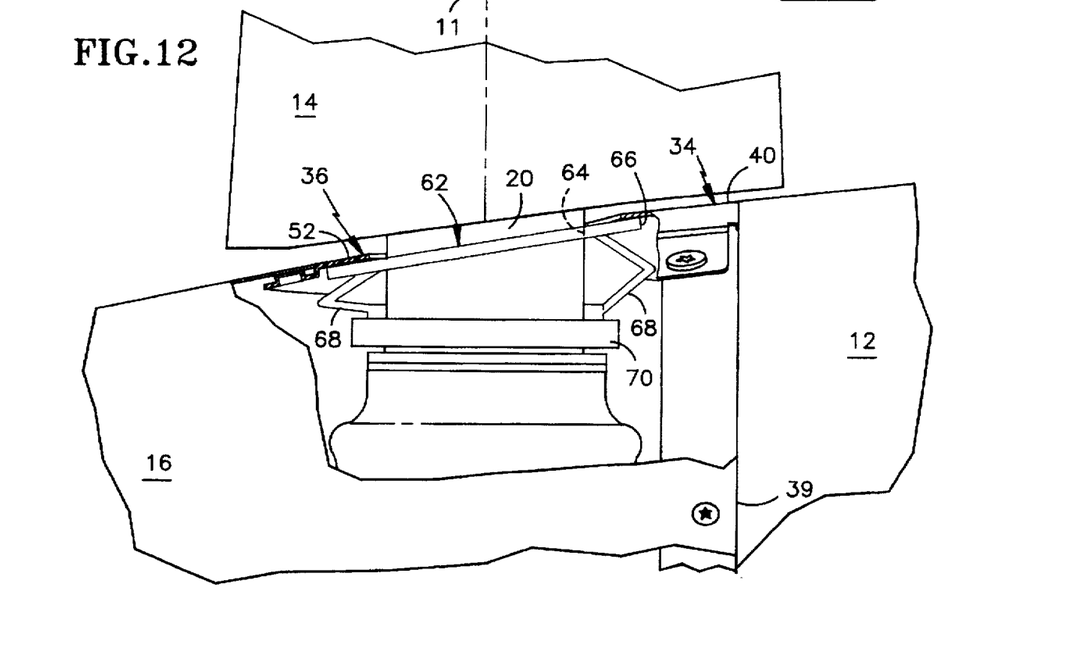
FIG. 12 is a propeller system with the spinner partially cut away with the Blade Opening Filler installed (partially cut away) and a collar installed on a non-circular blade root.

Spring clips 68 are inserted between the blade root 70 and collar 62 to allow the collar 62 to follow the contour of the spinner 16 and blade opening filler 32 during rotation of the propeller blade 14.

It should be understood by those skilled in the art that obvious structural modifications can be made without departing from the spirit or scope of the invention. Accordingly, reference should be made primarily to the accompanying claims, rather than the foregoing specification, to determine the scope of the invention.

Having thus described the invention, what is claimed is:

1. In a propeller system having a contoured spinner with a blade opening therethrough, and a propeller blade which is rotatable about a longitudinal axis of the propeller blade, having a blade shank which extends through the blade opening, said spinner releasably attached to a bulkhead, a blade opening filler comprising:
   (a) a spinner insert for generally filling a first portion of the blade opening between the spinner and the blade shank of the propeller blade; and
   (b) a bulkhead insert for generally filling a second portion of the blade opening between the bulkhead and the blade shank of the propeller blade, wherein said bulkhead insert is directly releasably attached to the bulkhead to secure said bulkhead insert in said second portion of the blade opening, wherein said bulkhead insert cooperating with said spinner insert for releasably mounting within the blade opening, wherein said bulkhead insert and said spinner insert form a continuation of an exterior surface of the contoured spinner for all degrees of rotation of the propeller blade about the longitudinal axis of the propeller blade.

2. A blade opening filler as set forth in claim 1 wherein said spinner insert is releasably attached to said bulkhead insert to secure the spinner insert in said first portion of the blade opening.

3. A blade opening filler as set forth in claim 1 wherein said spinner insert is releasably attached to the spinner to secure the spinner insert in said first section of the blade opening.

4. A blade opening filler as set forth in claim 1 wherein the spinner insert further comprises:
   (a) a first section forming a continuation of an exterior surface of the spinner when said spinner insert fills the blade opening, and
   (b) a second section fixedly attached to said first section, said second section engaged with an interior surface of said spinner when the spinner insert fills the blade opening, said second section cooperating with the interior surface of the spinner to secure said spinner insert against the interior surface of the spinner when the spinner is rotated.

5. A blade opening filler as set forth in claim 4 wherein said spinner insert further comprises said second section having raised portions for engaging said interior surface of the spinner.

6. A blade opening filler as set forth in claim 1 wherein said bulkhead insert further comprises:
   (a) a first section forming a continuation of an exterior of said spinner when said bulkhead insert fills said blade opening, and
   (b) a second section fixedly attached to said first section, said second section engaged with an interior surface of said spinner when said bulkhead insert fills the blade opening, said second section cooperating with the interior surface of the spinner to secure said bulkhead insert within the blade opening.

7. A blade opening filler as set forth in claim 1 further comprising:
   (a) at least one locking tab attached to said spinner insert, and
   (b) At least one bracket attached to said bulkhead insert whereby said locking tab matingly engages said bracket when said spinner insert and said bulkhead insert fill the blade opening.

8. A blade opening filler as set forth in claim 7 further comprising:
   said bracket whereby a fastener may be inserted through said bracket and across said locking tab.

9. A blade opening filler as set forth in claim 1 further comprising:
   a blade shank collar circumferentially mounted around the blade shank whereby said blade shank collar is matingly engaged with a portion of said blade opening filler.

10. A blade opening filler as set forth in claim 9 further comprising:
    a spring clip means and a retaining means for supporting said blade shank collar in engagement with said blade opening filler, said retaining means located on a portion of the blade shank whereby said spring clip can be positioned between said retaining means and said blade shank collar to engage said blade shank collar against said blade opening filler.

11. Opening filler for a contoured surface having an opening, through which extends a rotatable member rotatable about a longitudinal axis of the member, said contoured surface releasably attached to a second surface, the opening filler comprising:
    (a) a first insert to generally fill a first portion of the opening between the contoured surface and the rotatable member;
    (b) a second insert for generally filling a second portion of the opening between the second surface and the rotatable member, wherein said second insert is directly releasably attached to the second surface to secure said second insert in said second portion of the opening, said second insert cooperating with said first insert for releasably mounting within the opening, wherein said second insert and said first insert are arranged to form a continuation of the contoured surface for all degrees of rotation of the rotatable member about the longitudinal axis of the rotatable member.

12. An opening filler as set forth in claim 11 wherein said first insert is releasably attached to said second insert to secure the first insert in said first portion of the opening.

13. An opening filler as set forth in claim 11 wherein said first insert is releasably attached to the contoured surface to secure the first insert in said first section of the opening.

14. An opening filler as set forth in claim 11 wherein said first insert further comprises:
    (a) a first section forming a continuation of an exterior surface of the contoured when said first insert fills the opening, and
    (b) a second section fixedly attached to said first section, said second section engaged with an interior surface of said contoured surface when the first insert fills the opening, said second section cooperating with the interior surface of the contoured surface to secure said first insert against the interior surface of the contoured surface.

15. An opening filler as set forth in claim 14 wherein said first insert further comprises:

said first section having raised portions which engage an interior surface of the contoured surface.

16. An opening filler as set forth in claim 11 wherein said second insert further comprises:
 (a) a first section forming a continuation of an exterior of the contoured surface when said second insert fills the opening, and
 (b) a second section fixedly attached to said first section, said second section engaged with an interior surface of the contoured surface when said second insert fills the opening, said second section cooperating with the interior surface of the contoured surface to secure said second insert within the opening.

17. An opening filler as set forth in claim 11 further comprising:
 (a) at least one locking tab attached to said first insert, and
 (b) at least one bracket attached to said second insert whereby the locking tab matingly engages said bracket when said first insert and said second insert fill the opening.

18. A blade opening filler as set forth in claim 17 further comprising:
 said bracket whereby a fastener may be inserted through said bracket and across said locking tab.

19. A blade opening filler as set forth in claim 11 further comprising:
 a rotatable member collar circumferentially mounted around the blade shank whereby said blade shank collar is matingly engaged with a portion of said blade opening filler.

20. An opening filler as set forth in claim 11 further comprising:
 a spring clip means and a retaining means for supporting said rotatable member collar in engagement with said opening filler, said retaining means located on a portion of the rotatable member whereby said spring clip can be positioned between said retaining means and said rotatable member collar to engage said rotatable member collar against said opening filler.

* * * * *